(12) United States Patent
Kim et al.

(10) Patent No.: US 6,546,185 B1
(45) Date of Patent: Apr. 8, 2003

(54) SYSTEM FOR SEARCHING A PARTICULAR CHARACTER IN A MOTION PICTURE

(75) Inventors: Hyeon Jun Kim, Kyungki-do (KR); Jin Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/239,529

(22) Filed: Jan. 29, 1999

(30) Foreign Application Priority Data

Jul. 28, 1998 (KR) .......................................... 98-30367

(51) Int. Cl.[7] .................................................. H04N 5/91
(52) U.S. Cl. ............................ 386/46; 386/69; 386/95; 345/418; 345/719; 382/118
(58) Field of Search .......................... 386/46, 69, 1, 386/52, 53, 55, 95; 345/418, 719; 382/118; H04N 5/91

(56) References Cited

U.S. PATENT DOCUMENTS 5,748,776 A * 5/1998 Yoshida ....................... 382/118
5,777,618 A * 7/1998 Kita et al. ................... 345/418
5,982,979 A * 11/1999 Omata et al. ................. 386/69
6,195,497 B1 * 2/2001 Nagasaka et al. ............. 386/46

OTHER PUBLICATIONS

Tonomura et al., Journal Of Visual Languages and Computing, Jan. 1990, Academic Press, pp. 183–198.*
Little et al.,ACM Multi–media 93, 1993, A Digital On–Demand Video Service Supporting Content Based Queries, pp. 427–436.*
Lin et al., "Face Recognition/Detecting by Probabilistic Decision–Based Neural Network", Jan. 1997, IEEE, vol. 8, No. 1.*

* cited by examiner

Primary Examiner—Vincent Boccio
(74) Attorney, Agent, or Firm—Fleshner & Kim, LLP (57) ABSTRACT

A system for searching a particular character in a motion picture is disclosed comprising a recording medium on which the motion picture is recorded, the recorded motion picture being reproduced and displayed by a reproducing mechanism. The recording medium contains video information of a character table and location information indicative of scenes or sections in which a particular character appears. Thus, the system automatically searches and displays scenes and sections in which a character appears in the motion picture based upon the character table and the location information.

34 Claims, 9 Drawing Sheets

<Finding a Face from a Motion Picture>

FIG. 7

Image (t)     Image (t + $\Delta t$)

<Fixed image derived from a Motion Picture>

FIG. 8

Difference between image( t) and image( t + $\Delta$t)

FIG. 9

Face color area from the image(t + $\Delta$t)

FIG. 10

Overlapped image of FIG. 7 and FIG. 8

FIG. 11

Grid Image of FIG. 9

FIG. 12

Connected Component selected as the Sample of a Face

SYSTEM FOR SEARCHING A PARTICULAR CHARACTER IN A MOTION PICTURE

BACKGROUND OF THE INVENTION

1. Field of the Invention

The present invention relates to a system for reproducing a recorded picture and more particularly for searching sections of the recorded picture in which a particular object appears. The present invention also relates to a system for making and recording a database in a recording medium to be used in a system for reproducing a recorded picture.

2. Description of Related Art

Generally, a motion picture is recorded on a recording medium and can be reproduced for viewing when a user plays the recording medium. While a user views a motion picture on the recording medium, such as a drama, the user often wants to search scenes or sections in which a particular object or character appears. For example, for a user working on a motion picture scenario, editing, and/or evaluating a character's acting, it is necessary to search scenes or sections in which a particular character appears.

In the conventional technology, a user must search for the desired scenes or sections by reproducing the whole motion picture file in a play mode in combination with a fast forward/rewind mode. Therefore, the user must often reproduce and view the data recorded on the recording medium from beginning to the end, especially since objects appear in multiple points of the recorded data. Also, if the user is interested in more than one object, too much time and effort may be spent to separately and manually search for the relevant scenes or sections of the recorded data with respect to each object.

SUMMARY OF THE INVENTION

Accordingly, an object of the present invention is to solve at least the problems and disadvantages of the related art.

An object of the present invention is to provide a system for automatically searching a scene or scenes in which a particular object or objects appear in a recorded picture.

Another object of the present invention is to provide a system for automatically searching at least one section in which one or more objects successively appears in a recorded picture.

A further object of the present invention is to provide a system storing information regarding scenes or sections in which a particular object appears in a recorded picture and/or storing character information to allow an automatic search of scenes or sections in which a particular object appears in a recorded picture based upon the character and section information.

A still further object of the present invention is to provide a system for reading section/scene information with respect to each object from a recording medium containing the section/scene information, and for automatically searching and displaying sections/scenes in which the particular object selected by a user appears in a recorded picture.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a system for searching a particular object in a recorded picture comprises a recording medium on which the motion picture is recorded; the recording medium containing object information table and location information indicative of scenes or sections in which a particular object appears; a reproducing mechanism reproducing and displaying the recorded picture, wherein the system automatically searches and displays the scenes or sections in which objects appear based upon the object table and the location information.

The object table is made by searching scenes in which a prominent feature of each object, such as a character's face, appears in the recorded picture; classifying the scenes into groups by objects; and forming a table of the classified scene groups. A section in which a particular object appears is defined for the particular object if the same object successively appears within at least a predetermined interval. Namely, a particular object is determined to appear in a section when the following conditions are satisfied: the same object successively must appear within at least a predetermined interval; and the color of associated with the object such as the color of clothes of a character must be the same. The location information is the frame information. Moreover, the character table is formed by selecting representative scenes from the scenes of each object as representative scenes and by selecting at least one representative scene with respect to each object.

In an another embodiment of the present invention, a system for searching a particular object in a recorded picture comprises means for reading the location information of each object's scene in the recorded picture from a recording medium having the information of objects in the form of a table and the location information indicative of scenes that each object appears; and means for reproducing and displaying portions of the recorded picture corresponding to scenes in which an object selected by a user appears based upon the object table information read by the means for reading the information from the recording medium. The scenes in which the selected object appears are displayed using a table of representative scene of objects. The recorded picture may be directly displayed from a representative scene of the selected character. Moreover, the user may skip to each scenes in which a selected object appears in the recorded picture.

BRIEF DESCRIPTION OF THE ATTACHED DRAWINGS

The invention will be described in detail with reference to the following drawings in which like reference numerals refer to like elements wherein:

FIGS. 6 to 10 are grey scale print outs of computer generated images representing a display screen or the like. FIGS. 6 to 12 illustrate how faces are recognized in a motion picture according to the present invention.

DETAILED DESCRIPTION OF PREFERRED EMBODIMENT

Reference will now be made in detail to the preferred embodiments of the present invention, examples of which are illustrated in the accompanying drawings. For purposes of illustration only, the system for searching scenes or sections in which a particular object appears will be discussed with reference to a character of a motion picture.

Figure 1:
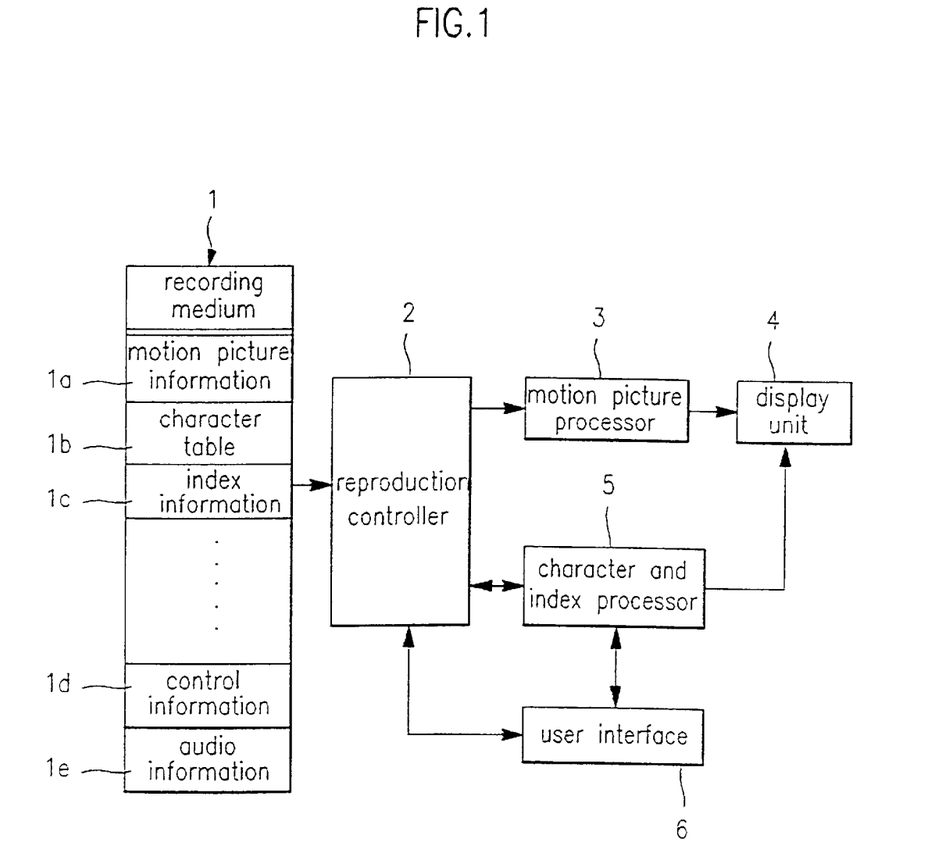
FIG. 1 is a block diagram showing an example of a recording format on a motion picture recording medium and an embodiment of a searching system for scenes or sections where a particular character appears from the recording medium according to the present invention.

As shown in FIG. 1, a searching system according to the present invention comprises: a recording medium 1 containing motion picture information 1$a$, character table information 1$b$, index information indicating locations of sections in which each character appears in the motion picture, control information 1$d$ necessary for reproducing the motion picture, and audio information 1$e$; a reproduction controller 2 reproducing the motion picture according to the information contained in the recording medium 1; a motion picture processor 3 processing the motion picture reproduced at the reproduction controller 2 and outputting a result to a display unit 4; a character and index processor 5 processing motion picture index information according to a section location information and a character table reproduced at the reproduction controller 2; and user interface 6 allowing a search in the motion picture by characters.

In the present embodiment, the reproduction controller 2 and the character and index processor 5 are separated. However, the processing of the character and index information and the control over the search in the motion picture may be carried out together using a computer. Additionally, the reproduction system illustrated in FIG. 1 can easily be implemented with design modification in the field of picture reproduction. Therefore, a system for searching sections in which a particular character appears in a motion picture according to the present invention is not limited to the embodiment illustrated in FIG. 1.

Figure 2:
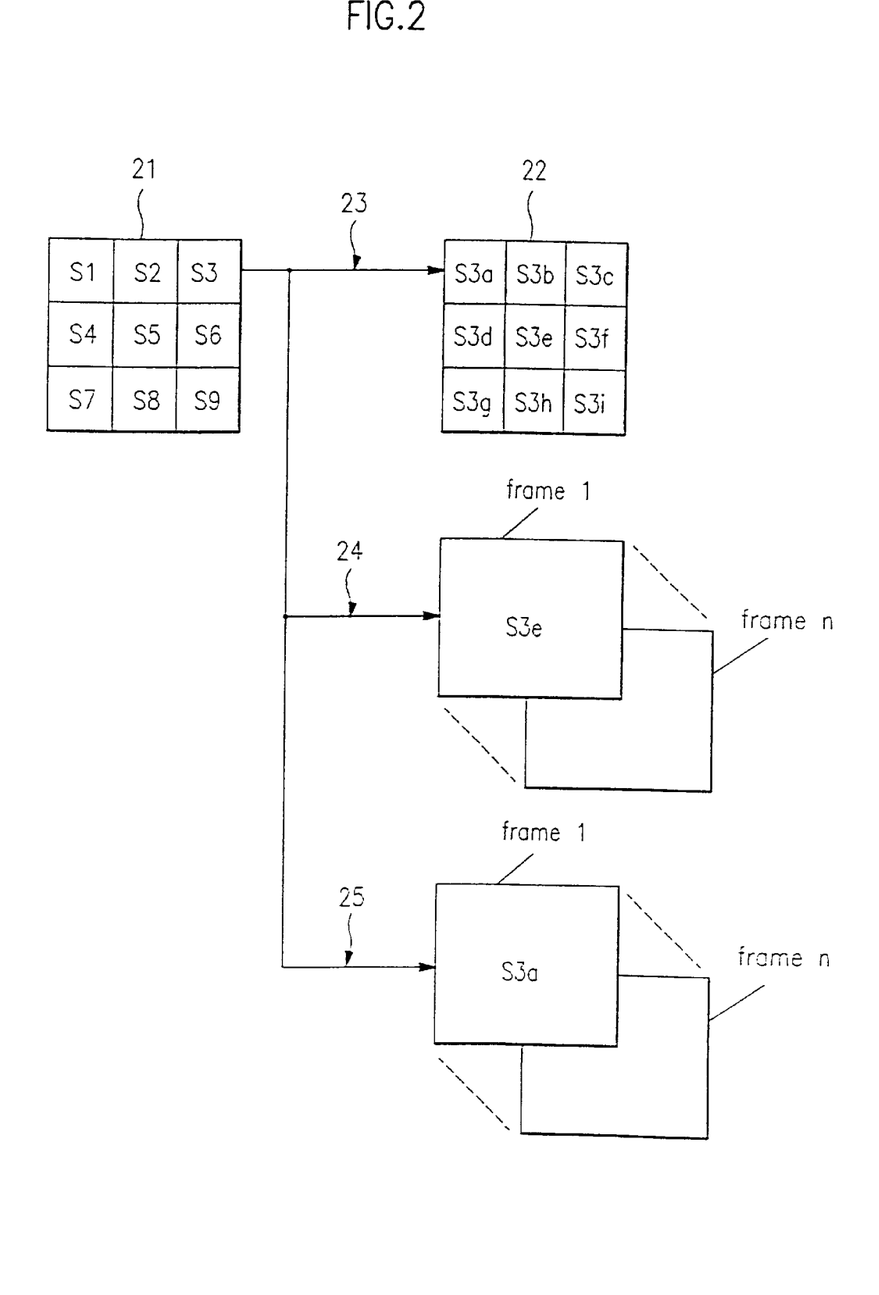
FIG. 2 illustrates how scenes or sections in which a particular character appears are displayed using a character table and index information according to the present invention.

The portion of the motion picture corresponding to the location in which a particular character appears may be reproduced as shown in FIG. 2 based upon the index information corresponding to the character table information 1$b$. In FIG. 2, the reference number 21 indicates the character table displayed on the display unit 4 and S1 to S9 indicate representative scenes of nine characters. Although the number of characters has been set to nine, the number of characters which can be displayed on the display unit 4 is not limited to nine.

The reference number 22 indicates the table information of nine scenes (S3$a$~S3$i$) in which a particular character appears when a particular character S3 is selected from the character table 21. Although the table 22 includes only nine scenes, the number of scenes would vary for each character depending upon the number of sections in which a character appears in the motion picture. One scene from the nine scenes (S3$a$~S3$i$) is shown in the character table 21 as a scene representing the particular character. For example, scene S3$e$ would be displayed in the S3 position of the character table 21.

Once a user selects a particular character S3 from the character table 21, the sections in which the character appears are automatically searched and displayed. The representative scene S3$e$ is searched and the motion picture is displayed starting from a first frame of the section corresponding to scene S3$e$ (24). Alternatively, the first scene S3$a$ in which the selected character appears may be searched and displayed starting from a first frame of the section corresponding to scene S3$a$ (25) rather than scene S3$e$. Moreover, after viewing one section, the user may select different sections in which the selected character appears by selecting a scene from table 22. The selected scenes would be searched and displayed starting from a first frame of the section corresponding to the selected scene.

Figure 3:
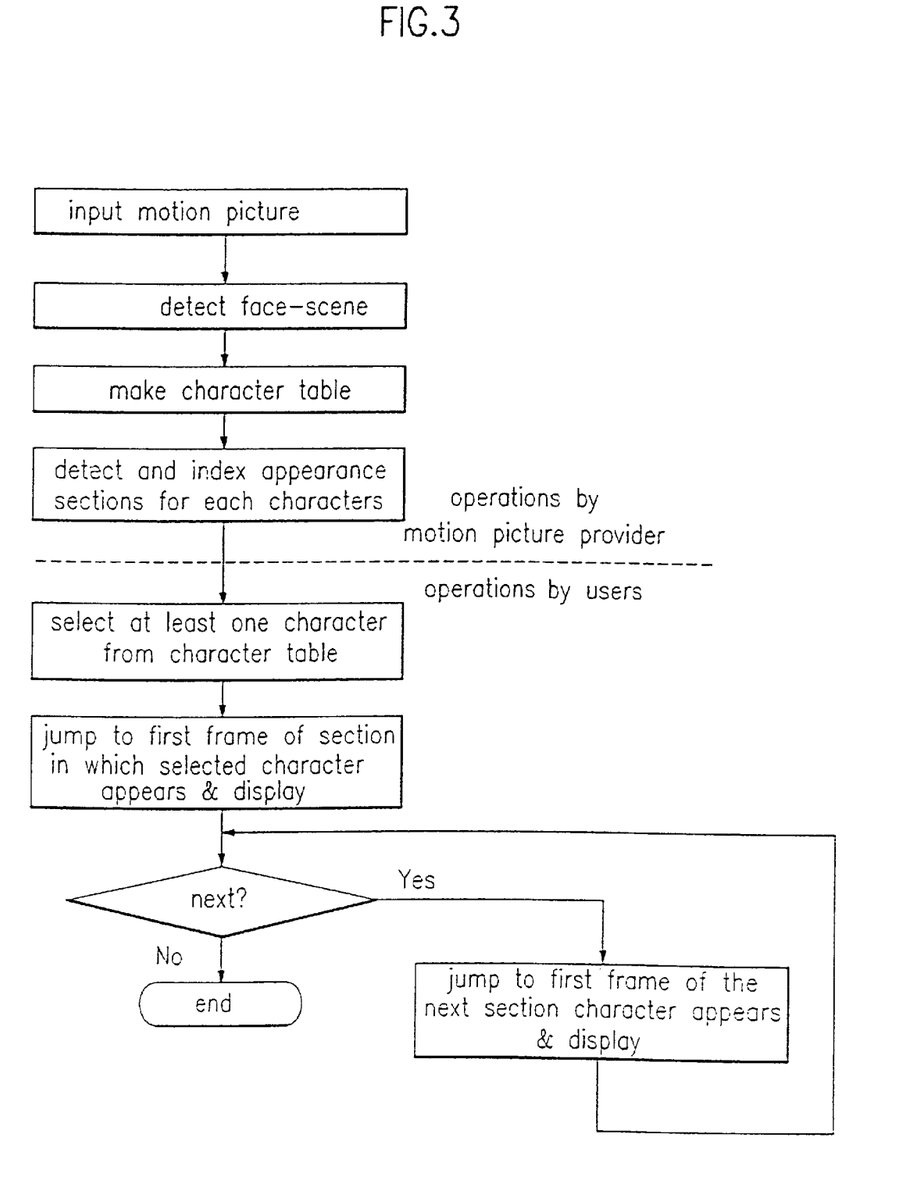
FIG. 3 is a flow chart of an operation for searching scenes or sections in which a particular character appears according to the present invention.

FIG. 3 shows an operation for making the recording medium in FIG. 1 and a control operation for automatically obtaining and displaying sections in which a particular character appears from a motion picture file recorded on the recording medium. Generally, a motion picture provider makes the recording medium by inputting a motion picture, detecting face_scenes, making character tables using the face_scenes, and determining and indexing appearance sections for each character. Afterwards, if a user selects at least one character from the character table, the first frame of the section in which the selected character appears is obtained and displayed. If there are more than one section for the selected character, the motion picture may jump to and display a next section in which the selected character appears.

Figure 4:
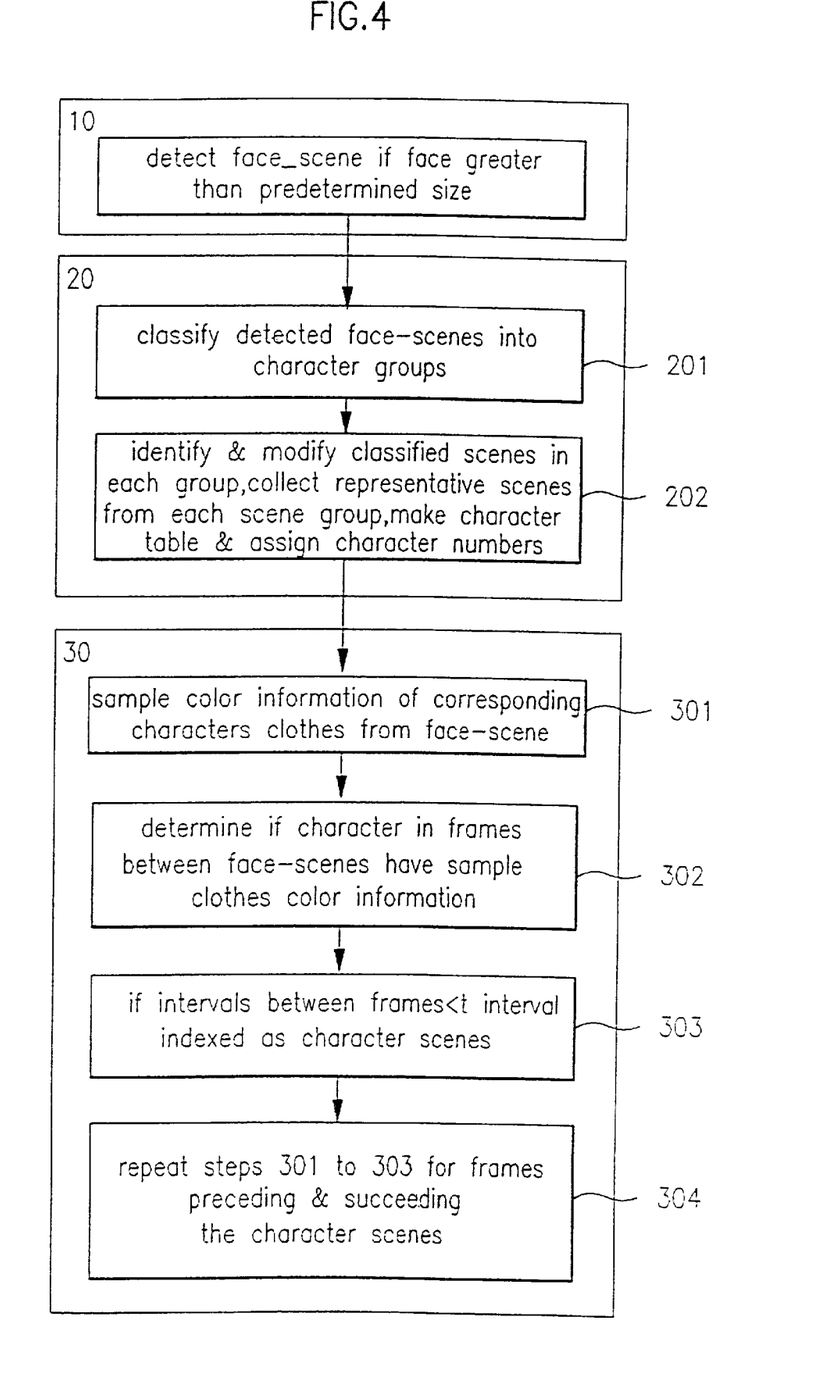
FIG. 4 is a flow chart showing an operation for searching scenes or sections in which a particular character appears and recording a result of the search on a recording medium according to the present invention.

A detailed discussion of the operation for making the recording medium will be given with reference to FIG. 4. The frames in which the displayed character faces are larger than a predetermined size are detected as Face_Scenes (10). Based upon the detected Face_Scenes, the character table is made (20) to display the different number of characters appearing in the motion picture. Particularly, the detected frames are initially classified and grouped into various characters using a face recognition technology (201). The character groups may be further checked and modified, if necessary. Subsequently, representative Face_Scenes from each character groups are selected and made into the character table, and an appropriate identification mark or number is assigned to each character (202).

After completing the character table, the sections in which a character appears are indexed by characters (for example, table 22 of FIG. 2) according to the character identification mark (30). Because a character may not always appear in full frontal profile, the color information of a character's clothes from the detected Face_Scenes is sampled and used to further identify the character in other frames (301). A determination is made whether clothes color information corresponding to the sample color information of a particular character appears in frames between two Face_Scenes having the same character. If an interval between the frames, including the two Face_Scenes, containing the sample clothes color information is less than a predetermined reference value t, such interval is determined to be a section in which a character appears. The section is indexed according to the character's identification mark and scene number (or frame information) (303).

Subsequently, a further determination is made whether clothes color information corresponding to the sample color information of the particular character appears in frames preceding and succeeding the frames of the first and last frames of the indexed section. If an interval between the preceding (or succeeding) frame and the first (or last) frame of the indexed section is less than the predetermined value t, such interval is also determined as part of the section and is indexed with a character's identification mark and a scene number. Other conditions of a character's appearance in the character section may also be determined such as whether the faces and the clothes color agree, the number of consecutive scenes in which the character appears, and whether the character appears as a supporting and not a leading actor/actress in various scenes.

The above procedures 301 to 303 are repeated for the frames preceding and succeeding the frames of the first and last frames of the indexed section until one of the conditions of a character's appearance fails. The above procedures are also performed for each character in the character table. Accordingly, the table of characters and location information of sections in which each character appears are recorded on the recorded medium 1. Moreover, the location information may be sorted according to each characters before being recorded on the recorded medium 1.

Utilizing the recording medium 1 manufactured by the above procedure, characters may be searched by a mechanism for reproducing motion pictures. Referring back to FIGS. 1 and 2, the reproduction controller 2 reproduces the motion picture information 1a, the character table information 1b, the index information 1c, the control information 1d, and the audio information 1e from the recording medium 1. The reproduced information is sent to the motion picture processor 3 and the character and index processor 5.

The information received by the character and index processor 5 is displayed on the display unit 4 as the character table 21. A user may select a character from the displayed character table 21 through an input device such as a mouse in the user interface 6. Moreover, the user may select more than one character at the same time. In response, the character and index processor 5 obtains the location information of sections in which the selected character(s) appear(s) in the motion picture from the index information 1c corresponding to the selected character and sends the location information to the reproduction controller 2.

The reproduction controller 2 automatically searches and displays the sections in which the selected character appears based upon the location information (namely, the frame information) received from the character and index processor 5. For example, if the character S3 is selected from the character table 21, the first frame of the section corresponding to the representative scene S3e is displayed (24). Alternatively, the table 22 including all the indexed sections in which a selected character appears may be displayed for selection by the user and the first frame of the section corresponding to the selected scene is displayed. Furthermore, a first frame of section corresponding to the scene S3a in which the selected character first appears in the motion picture may be displayed (25). After one section is displayed, the reproduction controller 2 checks whether other sections exist in which the selected character appears and displays the remaining sections in which the selected character appears.

In an another embodiment of the present invention, the scenes in which a selected character appears may simply be searched and displayed. This embodiment searches for a particular scene in which a corresponding character appears rather than a section of the motion picture in which the character is determined to appear consecutively for at least a predetermined time t.

Figure 5:
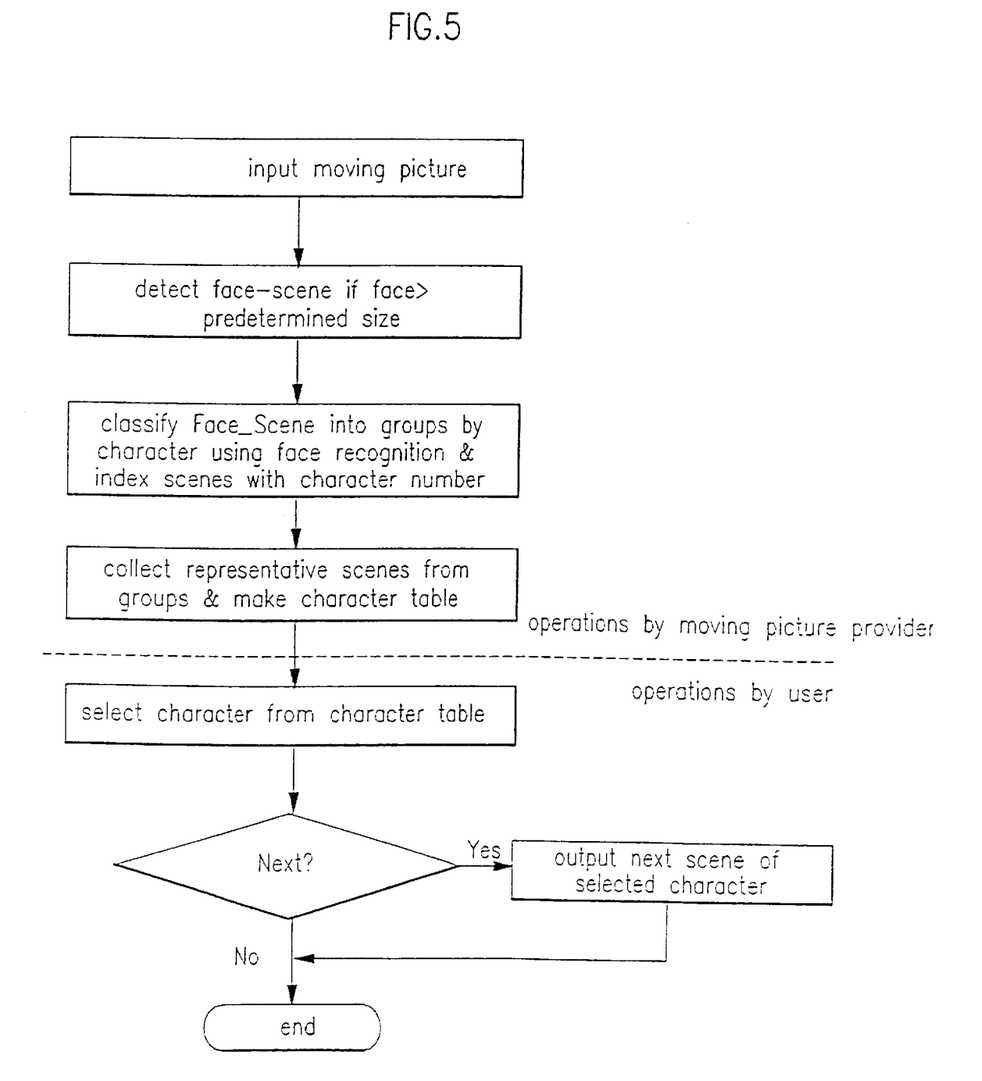
FIG. 5 is a flow chart of another operation for searching scenes in which a particular character appears according to the present invention.

The second embodiment, as shown in FIG. 5, is similar to the first embodiment. Generally, the motion picture provider detects Face_Scenes if a character's face displayed on the screen is larger than a predetermined size, classifies the detected scenes into character groups utilizing face recognition technique, indexes the scenes with character numbers to make the index information 1c, and collects representative scenes from the respective classified character groups to make the character table 1b. The character table 1b and the index information 1c (the location information of scenes in which each character appears or frame information) are recorded on the recording medium 1 along with a motion picture.

During reproduction, if a user selects a character from the character table 1b, scenes in which the selected character appears are searched and displayed based upon the index information 1c. Similarly with the first embodiment, the character is represented and displayed in the table using the character's representative scene. Accordingly, a user may skip from one scene to another in the motion picture and display a selected scene.

Although any existing face recognition technique may be used to implement the present invention, FIGS. 6 to 12 illustrate a preferred embodiment of a face recognition technique to be used in the present invention. Generally, the method is divided into a step of deriving input characteristics, and a step of measuring and comparing degrees of similarity.

In the step of deriving the input characteristics, six kinds of information are derived. Namely, equivalent density lines connecting portions having the same lightness on an image of a face; a direction of a nose; a 6×8 mosaic in the face area; a mosaic information obtained after an edge conversion of the face area; the gradation on a half line passing the center of the face in the image of the equivalent density lines; and an Aegean-face information and an Aegean-nose information obtained through a principal component analysis (PCA) are derived.

In the step of measuring the degrees of similarity, individual degrees of similarity are measured using the six derived kinds of information. Thereafter, weights are given to the degrees of similarity and the degrees of similarity are compared. The characters are aligned from the order of high degrees of similarity, and the same faces are recognized. The measurement of the degrees of similarity uses the Euclidean distance. A face recognition algorithm implemented in the present invention will now be described with reference to FIGS. 6 to 12,.

Figure 6:
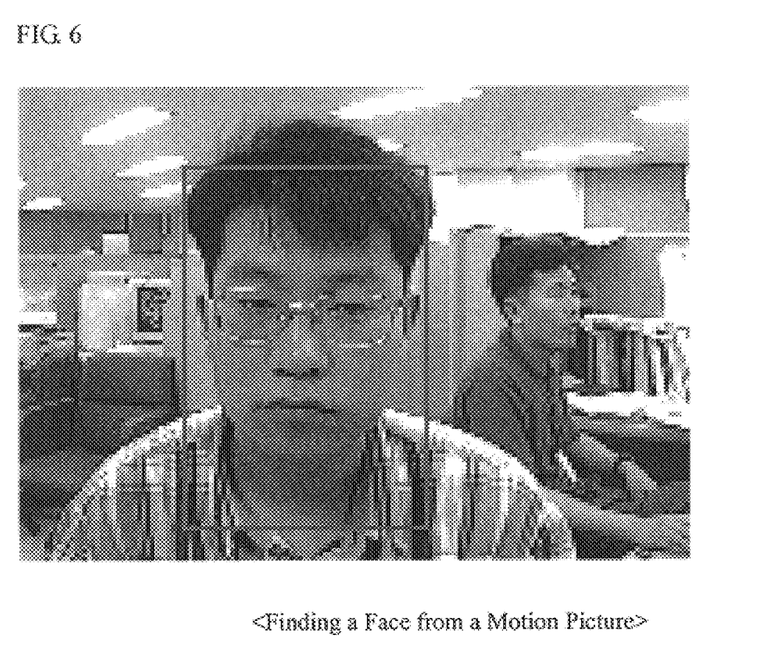

FIG. 6 is an image taken by a camera and the area partitioned with a quadrangle is a sampled face area. Similarly, images from a motion picture taken by a camera would be received, and successive sampling of a location and area of the face is carried out. If there are more than one characters in the image area of the camera, the face of the character closest to the camera is sampled.

Figure 7:
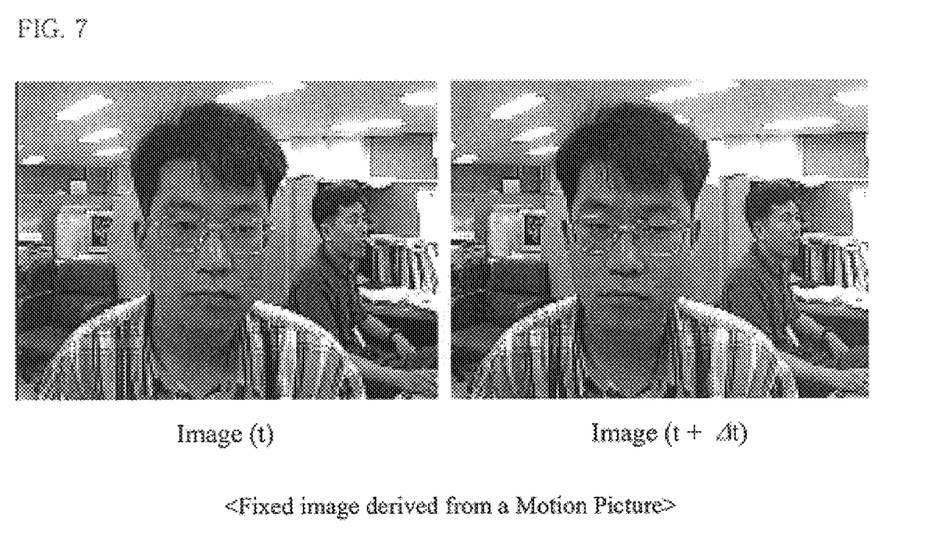
Figure 8:
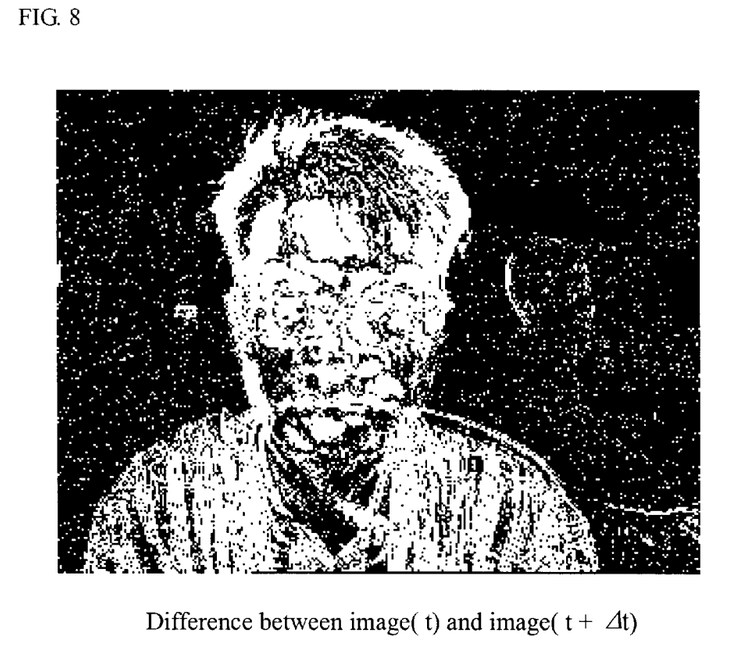
Figure 9:
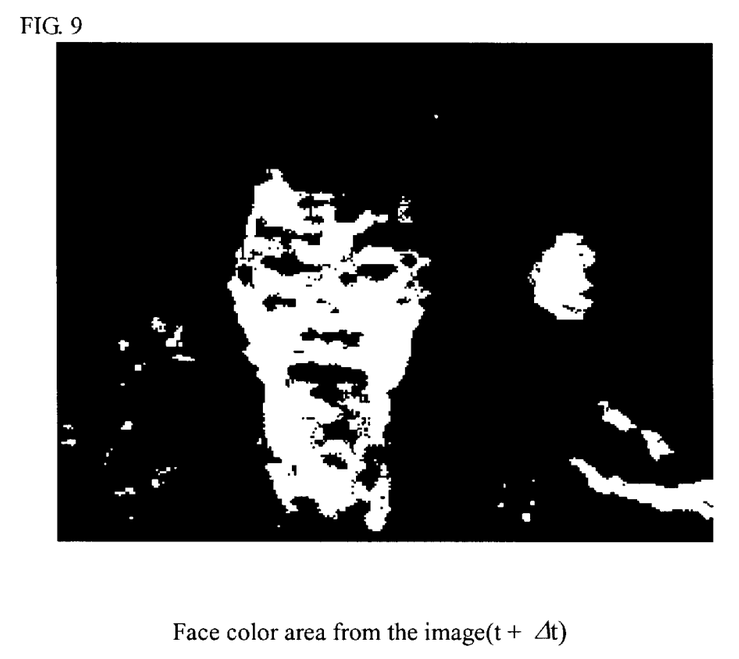

To find a face in a motion picture, two images are sampled at an interval of Δt as shown in FIG. 7. The difference between the two sampled images is obtained in units of pixels. Pixels with a difference exceeding a predetermined threshold are sorted and a differential image is obtained as shown in FIG. 8. Subsequently, the area having a skin color is derived as shown in FIG. 9 from the latter image of the two sampled images.

Figure 10:
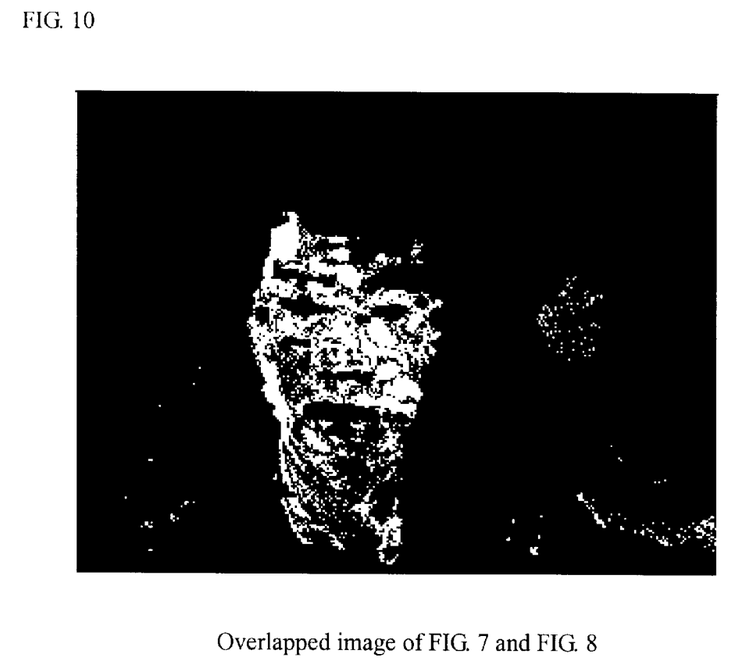
Figure 11:
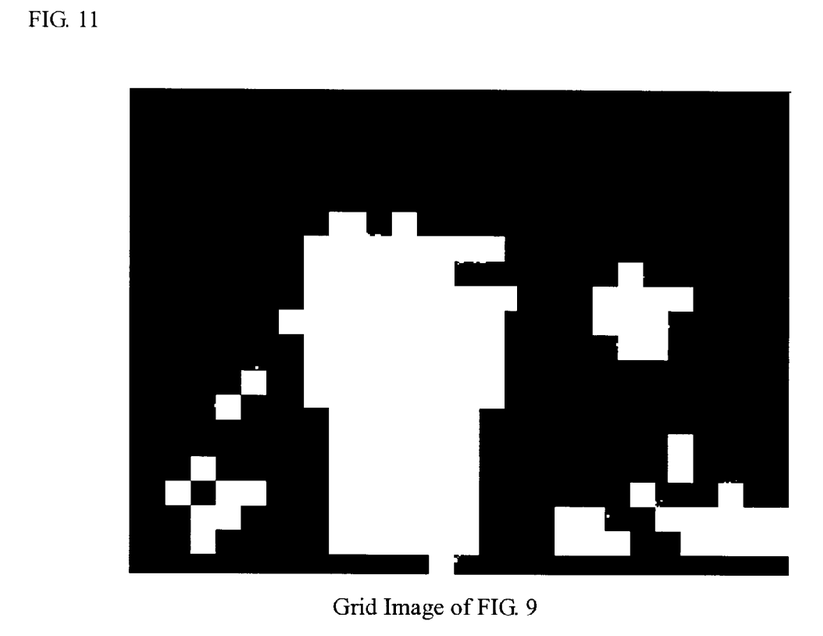

An AND operation is performed with respect to the differential image (FIG. 8) and the skin color image (FIG. 9), resulting in an image shown in FIG. 10. Therefore, FIG. 10 is an image area containing both the skin color and the motion. The image derived in units of pixels through the above operations is processed with a grid to detect an image as shown in FIG. 11. Using the grid processed image, an operation of obtaining connected components is performed using eight direction connection information. As a result, eight connected components from 1 to 8 are obtained as shown in FIG. 12.

Figure 12:
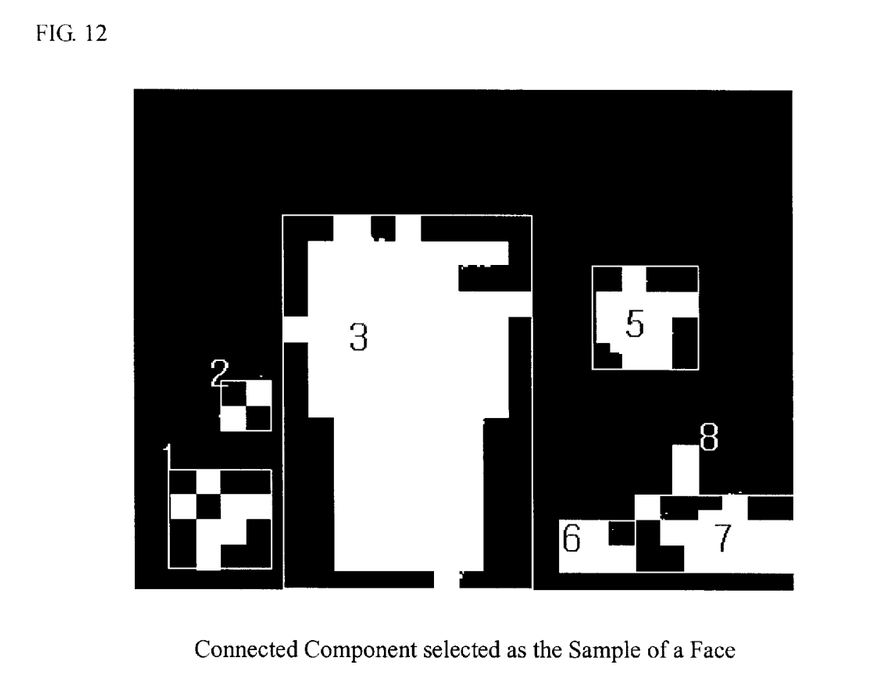

As shown in FIG. 12, a minimum quadrangle surrounding each component is defined and expressed as "Rect[i]". Among the eight connected components, only the components which may be a face area candidate selected based upon the following conditions:

a) scale of Rect[i] >threshold scale b) minimum value (MinValue) <breadth to length ratio of Rect[i] <maximum value (MaxValue)

c) density of Rect[i] (area of an actual component in Rect[i]) >threshold (density). Only the components satisfying the above conditions are regarded as face area candidates. Among the connected components considered as the face area candidates, the largest one is determined to be the face area.

For further accuracy, each line of four sides of the quadrangle may be checked to determine whether the density of each line (a ratio of the number of grids comprising the actual component in one line to a length of the line) is less than a threshold. If the density of the line is less than the threshold, the corresponding line is removed, thereby narrowing the quadrangle. Through such operations, an accurate search of a face using a motion picture and color information can be easily performed with high speed.

By applying such face search algorithm to the system for searching scenes or sections in which a particular character appears in a motion picture according to the present invention, scenes in which a particular character appears can be searched to be used to display scenes or sections in which a character appears. Accordingly, the present invention can automatically search and display all scenes or sections by characters appearing in a film or a drama. As a result, the present invention allows a user to conveniently evaluate, edit, or examine the scenes or sections in which a particular character appears, as well as to fetch and appreciate only scenes or sections that a particular character appears according to the user's taste.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A system for identifying and searching a particular character in a motion picture comprising:

a character table generator that initially detects and identifies characters by detecting Face_Scenes when a face in a frame of the motion picture is greater than a predetermined size and detecting characters by their faces in the Face_Scenes, makes a character table based on the detected faces in the Face_Scenes and indexes scenes in which the character in the character table appears in the motion picture based upon the Face_Scenes;

a recording medium inputting and storing the motion picture, the character table, and index information indicating scenes in which a character in the character table appears in the motion picture;

a display unit;

a user interface receiving a character selection; and reproduction unit automatically searching and displaying on the display unit at least one scene in which the selected character appears in the motion picture based upon the character table and the index information, wherein the character table generator detects faces in the Face_Scenes by automatically initially detecting faces in the Face_Scene, wherein the automatic initial detecting comprises identifying density lines connecting portions having the same lightness on an image of a face or identifying a direction of a nose.

2. A system of claim 1, wherein the reproduction unit comprises:

a reproduction controller automatically searching and reproducing the motion picture according to a location information;

a character and index processor processing the index information to obtain the location information indicating scenes in which the selected character in the character table appears in the motion picture; and a motion picture processor processing the motion picture reproduced at the reproduction controller and outputting a result to the display unit.

3. A system of claim 2, wherein the Face Scenes comprise only scenes where a face size is greater than a predetermined size.

4. A system of claim 1, wherein the character table is displayed on the display unit allowing a user to make the character selection through the user interface.

5. A system of claim 4, wherein the displayed character table is representative scenes of each character appearing in the motion picture.

6. A system of claim 1, wherein the index information indicates sections in which a character in the character table appears in the motion picture, and wherein the reproduction unit automatically searches and displays on the display unit at least one section in which the selected character appears in the motion picture based upon the character table and the index information.

7. A system of claim 6, wherein a section is a predetermined interval of scenes in which a character successively appears in the motion picture.

8. A system of claim 6, wherein the character table made by representative scenes of each character appearing in the motion picture is displayed on the display unit allowing a user to make the character selection through the user interface, and wherein the reproduction unit displays the first frame of the section corresponding to the representative scene based upon the index information.

9. A system of claim 6, wherein the reproduction unit displays the first frame of the section in which the selected character first appears in the motion picture based upon the index information.

10. A system of claim 6, wherein the indexed sections of the selected character are displayed on the display unit allowing a user to make a section selection through the user interface and wherein the reproduction unit displays the first frame of the selected section.

11. A system of claim 6, wherein the reproduction unit automatically displays all the sections of the selected character.

12. A system of claim 1, wherein the reproduction unit automatically displays all the scenes of the selected character.

13. The system for identifying and searching a particular character in a motion picture as claimed in claim 1, wherein the character table generator detects faces in the Face_Scenes by sampling two images at an interval of Δt, where the difference between the two sampled images are sorted to create a differential image and the differential image, if greater than a predetermined threshold, is defined as a face.

14. The system for identifying and searching a particular character in a motion picture as claimed in claim 1, wherein the automatic initial detecting further comprises identifying a gradation of a face.

15. The system for identifying and searching a particular character in a motion picture as claimed in claim 1, wherein the automatic initial detecting further comprises identifying a gradation on a half line passing a center of a face in an image of equivalent density lines.

16. The system for identifying and searching a particular character in a motion picture as claimed in claim 1, wherein the automatic initial detecting further comprises identifying an Aegean-face information and an Aegean-nose information obtained through a principle component analysis (PCA).

17. The system for identifying and searching a particular character in a motion picture as claimed in claim 1, wherein the character table generator indexes scenes by:
  extracting color information samples of a character's clothes from the detected Face_Scenes;
  determining whether clothes color information corresponding to the sample color information of a character appears in frames between two Face_Scenes of a character group from which the color information was extracted;
  designating an interval between two frames as a section if the interval between frames, including said two Face_Scenes, containing the sample clothes color information is less than a predetermined reference value t; and
  indexing the designated sections according to the character's identification mark and a scene number.

18. A method of producing a recording medium comprising:
  inputting and displaying a motion picture;
  detecting previously unclassified Face_Scenes when a face in a frame of the motion picture is greater than a predetermined size;
  automatically initially identifying, classifying, making and recording of characters into a character table based upon the classified Face_Scenes; and
  indexing scenes in which a character in the character table appears in the motion picture based upon the Face_Scenes, wherein the indexing the scenes comprises,
    extracting color information samples of a character's clothes from the detected Face_Scenes,
    determining whether clothes color information corresponding to the sample color information of a character appears in frames between two Face_Scenes of a character group from which the color information was extracted,
    designating an interval between two frames as a section if the interval between frames, including said two Face_Scenes, containing the sample clothes color information is less than a predetermined reference value t, and
    indexing the designated sections according to the character's identification mark and a scene number.

19. A method of claim 18, wherein the making the character table comprises:
  classifying and grouping the detected Face_Scenes into various characters using a face recognition technology;
  selecting representative Face_Scenes from each character group; and
  making the character table with the selected representative Face_Scenes, and assigning an identification mark to each character in the character table.

20. A method of claim 19, wherein grouping the detected Face_Scenes into various characters further includes manually checking and modifying the character groups.

21. A method of claim 18, wherein the indexing further comprises:
  (a) determining whether clothes color information corresponding to the sample color information of the character in a indexed section appears in frames preceding and succeeding the frames of the first and last frames of said indexed section;
  (b) designating an interval between the preceding frame determined to contain clothes color information corresponding to the sample color information of the character in a indexed section and the first frame of the indexed section as part of said indexed section if the interval is less than the predetermined value t;
  (c) designating an interval between the succeeding frame determined to contain clothes color information corresponding to the sample color information of the character in a indexed section and the last frame of the indexed section as part of said indexed section if the interval is less than the predetermined value t;
  (d) re-indexing the indexed section, if necessary; and
  repeating steps (a)–(d) for each indexed sections.

22. A method of producing a recording medium as claimed in claim 18, wherein characters are initially identified and classified automatically and not manually.

23. A method of producing a recording medium as claimed in claim 18, wherein the automatic initial classification of characters comprises identifying a face of a character by sampling two images at an interval of $\Delta t$, where the difference between the two sampled images are sorted to create a differential image and the differential image, if greater than a predetermined threshold, is defined as a face.

24. A system for searching a particular character in a motion picture comprising:
  a character and index processor comprising a facial recognizer to detect Face_Scenes, a facial classifier to initially classify and group characters, wherein the facial classifier assigns a character identification mark or number to each character and a table generator to generate a character table based on each character's identification mark or number and a portion of the motion picture in which each character appears;
  a recording medium storing the motion picture, the character table, and index information indicating scenes in which a character in the character table appears in the motion picture; and
  a display unit displaying the character table allowing a user to select a character and displaying the portion of the motion picture in which the character appears.

25. A system of claim 24, wherein the index information indicates sections in which a character in the character table appears in the motion picture, and wherein the reproduction unit automatically searches and displays on the display unit at least one section in which the selected character appears in the motion picture based upon the character table and the index information.

26. A system of claim 25, wherein the indexed sections of the selected character are displayed on the display unit allowing a user to make a section selection through the user interface and wherein the reproduction unit displays the first frame of the selected section.

27. The system of claim 24, wherein the character table generating means classifies and groups the detected Face_Scenes into various characters using a face recognition technology, selects representative Face_Scenes from each character group, makes the character table with the selected representative Face_Scenes, and assigns the identification mark to each character in the character table.

28. The system of claim 24, wherein the indexing means extracts color information samples of a character's clothes from the detected Face_Scenes, determines whether clothes color information corresponding to the sample color information of a character appears in frames between two Face_Scenes of a character group from which the color information was extracted, designates an interval between two frames as a section if the interval between frames, including said two Face_Scenes, containing the sample clothes color information is less than a predetermined reference value t, and wherein the designated sections are indexed according to the character's identification mark and a scene number.

29. The system for searching a particular character in a motion picture as claimed in claim 24, wherein initial identification of characters is automatically done by the system without manual input or intervention by a system user.

30. The system for searching a particular character in a motion picture as claimed in claim 24, wherein initial identification of characters comprises identifying a face by sampling two images at an interval of $\Delta t$, where the difference between the two sampled images are sorted to create a differential image and the differential image, if greater than a predetermined threshold, is defined as a face.

31. A system of claim 24, wherein the facial recognizer detects faces in the Face_Scenes by automatically initially detecting faces in the Face_Scene, wherein the automatic initial detecting comprises identifying density lines connecting portions having the same lightness on an image of a face or identifying a direction of a nose.

32. A system of claim 31, wherein the automatic initial detecting further comprises identifying a gradation of a face.

33. A system of claim 31, wherein the automatic initial detecting further comprises identifying a gradation on a half line passing a center of a face in an image of equivalent density lines.

34. A system of claim 31, wherein the automatic initial detecting further comprises identifying an Aegean-face information and an Aegean-nose information obtained through a principle component analysis (PCA).

* * * * *